United States Patent [19]
Hochberg et al.

[11] 3,974,769
[45] Aug. 17, 1976

[54] METHOD AND APPARATUS FOR RECORDING INFORMATION ON A RECORDING SURFACE THROUGH THE USE OF MISTS

[75] Inventors: Frederick Hochberg; Arnold Reisman, both of Yorktown Heights, N.Y.

[73] Assignee: International Business Machines Corporation, Armonk, N.Y.

[22] Filed: May 27, 1975

[21] Appl. No.: 581,058

[52] U.S. Cl. ............................ 101/426; 101/DIG. 13; 427/18; 427/21; 427/23; 96/1.2; 346/74 EK
[51] Int. Cl.² ........................ B41M 1/42; G03G 5/12
[58] Field of Search ............ 101/1, DIG. 1, DIG. 13, 101/426, 211; 427/15, 16, 17, 18, 19, 21, 30, 47, 145, 23, 131, 13; 96/1 R, 1 E, 1 LY, 1.2, 1.3; 118/621, 637; 106/22, 23; 346/74 EK

[56] References Cited
UNITED STATES PATENTS

| | | | |
|---|---|---|---|
| 2,932,690 | 4/1960 | Adams et al. | 101/DIG. 13 |
| 3,064,259 | 11/1962 | Schwertz | 101/DIG. 13 |
| 3,155,531 | 11/1964 | Fauser et al. | 427/17 |
| 3,253,913 | 5/1966 | Smith et al. | 96/1 LY |
| 3,392,018 | 7/1968 | Metcalfe et al. | 96/1 LY |
| 3,654,900 | 4/1972 | Yang | 427/17 X |
| 3,776,757 | 12/1973 | Eastman et al. | 427/16 |
| 3,793,048 | 2/1974 | Nagashima et al. | 427/21 X |
| 3,827,905 | 8/1974 | Roth | 427/21 X |
| 3,864,125 | 2/1975 | Tamai | 96/1 LY |
| 3,880,689 | 4/1975 | Rolker et al. | 96/1 EX |

*Primary Examiner*—E. H. Eickholt
*Attorney, Agent, or Firm*—Frank C. Leach, Jr.

[57] ABSTRACT

A first mist having at least one material is selectively applied to selected portions of a recording surface to form desired characters or other information thereon. A second mist of a material which reacts with the one material is applied to the recording surface. The reaction of the two materials forms a compound on the selected portions of the recording surface having a sufficient contrast with the recording surface to produce characters or other information on the recording surface. If the one material has an ink applied therewith to the recording surface, the material in the second mist reacts with the one material to enhance the contrast of the ink on the recording surface.

30 Claims, 3 Drawing Figures

METHOD AND APPARATUS FOR RECORDING INFORMATION ON A RECORDING SURFACE THROUGH THE USE OF MISTS

In ink printing, it is desired to have a significant contrast between the character or other information and the recording surface on which it is formed so that the character or other information is readily visible. One means of doing this has been suggested in U.S. Pat. No. 3,049,077 to Damm, Jr. wherein the information is printed in various colors so that there is a desired contrast between the information and the recording surface.

In the aforesaid Damm, Jr. patent, a mixture of at least two different dyes, which have different solubility properties and preferably distinctly different colors, is applied to a recording surface. The mixture can be applied by a magnetic or electrostatic process, for example. Then, a solvent is applied to the recording surface to dissolve a portion of at least some of the dyes to give the desired color. The information is fixed to the recording surface by the spraying of the solvent, which evaporates almost instantly after being applied to the recording surface. The residual unfixed dye pigments are removed from the recording surface by a brush.

With the present invention, the enhancement of the contrast between the character or other information and the recording surface is obtained without the requirement of various colored dyes and the use of different solvents. The present invention accomplishes this increased contrast between the printed information and the recording surface through using two materials which react with each other to produce the desired contrast. By appropriately selecting the materials, which may be a single color or colorless, a wide range of colors is obtainable to give the desired contrast and color between the printed information and the recording surface.

In the present invention, one of the materials is selectively applied to selected portions of the recording surface to produce an image of the desired information such as a character, for example, on the recording surface. Then, a second material, which reacts with the first material, is applied to the recording surface and reacts with the first material on the selected portions of the recording surface to produce a sufficient contrast with the recording surface to form the information on the recording surface so that it is readily visible.

The materials are preferably applied to the recording surface through each of the materials being disposed within a mist. The mist is a cloud of fine droplets, which are non-directed particles.

The selective application of the first mist to selected portions of the recording surface can be accomplished by either a magnetic or electrostatic process, for example. If a magnetic process is imployed, a magnetic carrier must be included in the first mist so that the mist is attracted to the selected portions of the recording surface to form the characters to be printed.

When using an electrostatic process, it is necessary to utilize a recording surface capable of retaining a charge applied to selected portions thereof by an electrostatic field. This enables the material of the first mist to be deposited selectively on the recording surface.

If a mist of ink containing droplets of a particular size is applied to the paper at a controlled velocity, the ink will not wet the paper. This non-wetting effect is probably due to the relatively high surface tension of the small particles such that the particles will not wet the paper at a given velocity. Under the influence of a magnetic or electrostatic field, the particles coalesce to increase the particle size whereby the surface tension is reduced to produce wetting. A further wetting is promoted by an increase in the particle velocity because of the force of the electrostatic or magnetic field.

The recording of information on a recording surface through the use of a mist and an electrostatic process has previously been suggested in pages 1622 and 1623 of the March 1968 (volume 10, No. 10) issue of the IBM Technical Disclosure Bulletin, pages 2389 to 2391 of the Jan. 1973 (volume 15, No. 8) issue of the IBM Technical Disclosure Bulletin, and Canadian patent 586,010 to Jarvis. Each of these is concerned with the application of an ink in a mist to the recording surface by an electrostatic process.

In each of these previously suggested means for applying an ink in a mist to the recording surface by an electrostatic process, the contrast with the recording surface has depended solely on the application of the ink thereto in the mist. To obtain a desired contrast with the foregoing suggested means of recording information on a recording surface through the use of a mist by an electrostatic process, the speed of printing has to be significantly slow to obtain the desired contrast. That is, the recording surface must not be moved relative to the application of the mist at any rapid speed to enable a sufficient period of time for application of the mist. Thus, these previously suggested means for recording information on a recording surface through the use of a mist and an electrostatic process have not been sufficiently fast for practical use.

The present invention satisfactorily overcomes the problems of using a mist to record information such as characters, for example, on a recording surface and still obtain a sufficient contrast with the recording surface while having rapid printing. This is accomplished through using a different material in each of two separate mists to react with each other to produce the necessary contrast. Thus, the present invention enables information to be recorded on a recording surface through the use of mists while still obtaining rapid printing.

It has previously been suggested in U.S. Pat. No. 1,423,246 to Morse to apply an invisible ink formed of ferric sulphate mixed with phosphoric acid to a paper. Applying a coating of a solution of yellow prussiate of potassium (ferrocyanide) to the obverse side of the paper enables a print to be made by immersion of the paper with the ink in water. However, this has the disadvantages of the paper requiring a very long period of time to dry and special types of paper strong enough for immersion.

In U.S. Pat. No. 44,180 to Mitchell, it is suggested to form an ink of ferric chloride and to bring impressions having this ink into contact with copying paper treated by potassium ferrocyanide to produce an insoluble image of positive color. In U.S. Pat. No. 241,682 to Mallory, it is suggested to subject a black ink formulation, composed of gallic and tannic acid and the salts of iron and gum, to a few minutes of oxygen gas to form a permanent black ink.

Thus, while it has previously been suggested to form ink of a material reacting with a paper coated with another material or to form a permanent ink by subjecting the ink to oxygen gas, these do not suggest applying two separate mists of two different materials to a recording surface. Furthermore, there is no suggestion of selectively applying one of the mists to selected portions of the recording surface to form the desired information and then applying the second mist to the recording surface to react with the material of the first mist on the recording surface to produce a sufficient contrast between the printed information and the recording surface.

Accordingly, the present invention produces rapid printing of information having a relatively high contrast with respect to the recording surface by the use of non-directed particles. Furthermore, it is not necessary to specially treat the recording surface for the applied material to react therewith.

An object of this invention is to provide a method and apparatus for producing a desired contrast between recorded information and a recording surface.

Another object of this invention is to provide a method and apparatus to write information on a recording surface through depositions of two separate materials to produce a reaction therebetween.

The foregoing and other objects, features, and advantages of the invention will be apparent from the following more particular description of preferred embodiments of the invention, as illustrated in the accompanying drawing.

Figure 1:
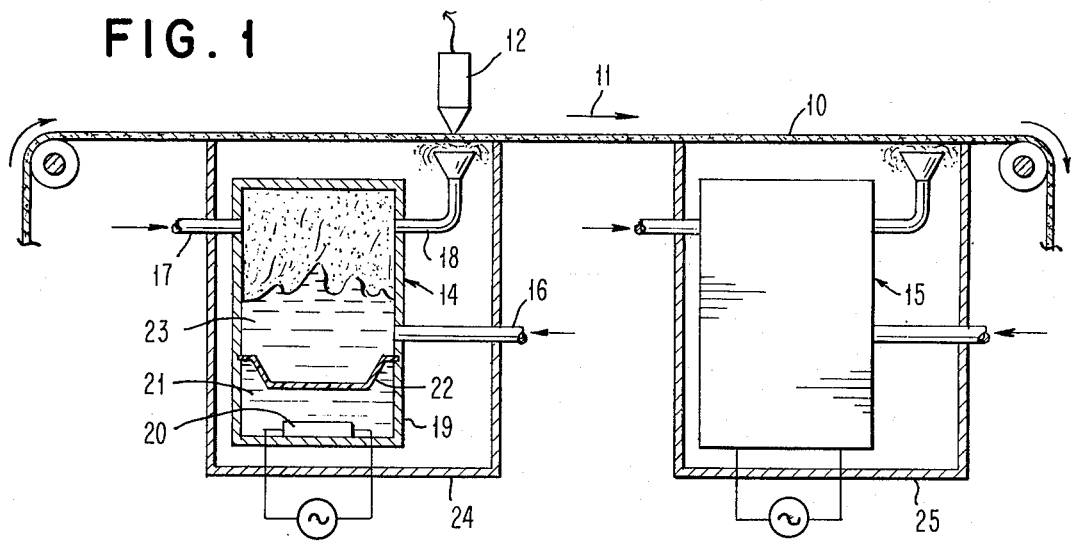
FIG. 1 is a schematic view showing an arrangement of the present invention for magnetically recording information on a recording surface.

Referring to the drawing and particularly FIG. 1, there is shown a recording surface such as a paper 10 moving in the direction of an arrow 11. The paper 10 may be advanced at a desired speed by any well-known means.

A magnetic field source 12 is disposed on one side of the paper 10 to produce a desired magnetic field gradient for transmittal to the paper 10. The magnetic field source 12 can be a rotating drum, a recording head, or a tape, for example.

When the magnetic field source 12 is a rotating drum, for example, the drum could have the information, which is to be recorded on the paper 10, magnetically stored thereon. Similarly, the tape could have the information such as characters, for example, imprinted thereon magnetically. Likewise, the recording head could have the information applied thereon magnetically. Any other suitable means of producing the desired magnetic field gradient can be utilized as the magnetic field source 12.

A first mist generator 14 is disposed on the opposite side of the paper 10 from the magnetic field source 12. The mist generator 14 has a magnetic carrier, which can be a ferrofluid ink such as that described in U.S. Pat. No. 3,805,272 to Fan et al, for example, therein.

The magnetic carrier is mixed with a suitable material for supply from the mist generator 14 towards the paper 10. The material must be capable of being applied to the paper 10 in a mist and still react with another material, which is supplied from a second mist generator 15, to produce a compound having a desired contrast with the paper 10 so that the produced information is easily visible. The material in the first mist generator 14 is dependent upon the material in the second mist generator 15, which is spaced from the first mist generator 14 in the direction of movement of the paper 10.

One suitable example of the two materials capable of reacting with each other to produce the desired contrast with the paper 10 are ferrous chloride ($FeCl_2$) and potassium ferricyanide [$K_3Fe(CN)_6$]. When using these two materials, the ferrous chloride is preferably mixed with the ferrofluid ink for supply from the first mist generator 14 and the potassium ferricyanide is preferably supplied from the second mist generator 15.

The mixture of ferrous chloride and ferrofluid ink is supplied to the mist generator 14 through a line 16. A pressurized carrier gas such as air or nitrogen, for example, is supplied through a line 17 to the upper portion of the mist generator 14 to carry as a mist the mixture of ferrous chloride and ferrofluid ink through an outlet line 18 to the paper 10. A similar arrangement exists for the second mist generator 15.

One suitable example of the mist generators 14 and 15 is sold by The DeVilbiss Company as model 35. As shown for the mist generator 14, each of the mist generators 14 and 15 includes a housing 19 having a piezoelectric transducer 20 vibrating at a suitable frequency. For example, a frequency of 1.2 megaHertz is satisfactory for a particle size of about three microns. The housing 19 has water 21 disposed therein its lowermost portion and subjected to the vibrations of the transducer 20.

A non-porous membrane 22 separates the water 21 from a mixture 23 of ferrous chloride and ferrofluid ink, which is supplied through the line 16. The membrane 22 enables the energy to be coupled from the water 21 to the mixture 23. The pressurized carrier gas carries the mist through the outlet line 18 for application to the paper 10.

Accordingly, as the paper 10 moves past the magnetic field source 12, a magnetic field gradient is produced and transmitted through the paper 10 to attract the mixture of the ferrofluid ink and the ferrous chloride to the selected portions of the paper 10 to which the magnetic field gradient from the magnetic field source 12 has been selectively applied. The first mist generator 14 is enclosed by a hood 24. The hood 24 has suitable suction or magnetic means (not shown) to attract all of the mist supplied by the first mist generator 14 and not attracted to the paper 10.

When the paper 10 passes the second mist generator 15 during its movement in the direction of the arrow 11, the potassium ferricyanide, which is supplied as a mist by the mist generator 15, reacts with the ferrous chloride on the selected portions of the paper 10 to produce a desired contrast with the paper 10 so that the desired information such as characters, for example, appears on the paper 10. It should be understood that the second mist generator 15 supplies the potassium ferricyanide to all of the paper 10.

The second mist generator 15 also is enclosed by a hood 25. The hood 25 has suitable suction or magnetic means (not shown) to attract all of the mist supplied by the second mist generator 15 and not attracted to the paper 10.

As soon as the potassium ferricyanide reacts with the ferrous chloride on the selected portions of the paper 10, the information appears on the paper 10. The paper 10 drys immediately after application to the paper 10 of the potassium ferricyanide from the mist generator 15.

Depending upon the speed of printing and the dilution of ink with the ferrofluid, the ferrofluid ink may produce some contrast with the paper 10 during its application to the selected portions thereof. If there is some contrast between the ferrofluid ink and the paper 10 so that the printed information is visible, then the reaction of the ferrous chloride and the potassium ferricyanide enhances the contrast of this ink on the paper 10.

Figure 2:
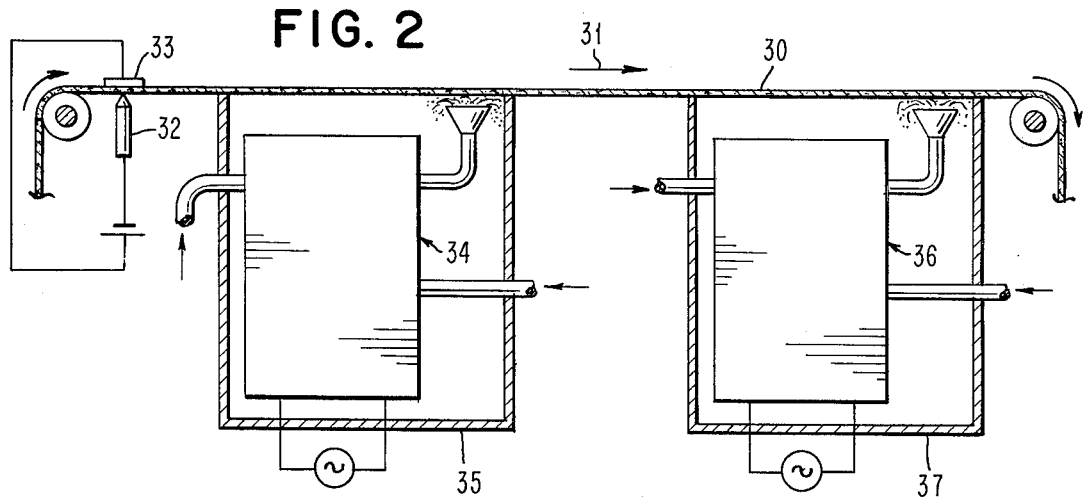
FIG. 2 is a schematic view of another embodiment of the present invention for electrostatically recording information on a recording surface.

Referring to FIG. 2, there is shown a paper 30 moving in the direction of an arrow 31. The paper 30 must be capable of retaining any charge applied to any selected portion thereof by an electrostatic field source such as an electrode 32 and a metal conductor 33, for example. Thus, the paper 30 has a dielectric coating on one side thereof. The electrode 32 is disposed on the dielectric side of the paper 30 and the metal conductor 33 on the non-coated side of the paper 30 to apply an electrostatic field to the dielectric side of the paper 30 in selected portions whereby the selected portions define the desired information such as characters, for example, to be recorded on the paper 30.

A first mist generator 34, which is preferably the same type as the mist generators 14 and 15, is disposed on the same side of the paper 30 as the electrode 32 so that the material within the mist generator 34 is attracted to the selected portions of the paper 30 charged by the electrode 32. One suitable example of the material in the first mist generator 34 is ferrous chloride in the same manner as the first mist generator 14 of FIG. 1 contained ferrous chloride. However, it is not necessary to have a carrier in the mist generator 34. If there is a carrier, it would not be a magnetic carrier as in the first mist generator 14 of FIG. 1, but it could contain an ink if desired.

The charge on the selected portions of the paper 30 attracts the ferrous ions of the ferrous chloride thereto to form the desired information such as characters, for example, thereon. This causes the ferrous chloride to be retained on the paper 30 in these selected portions.

The first mist generator 34 is enclosed by a hood 35. The hood 35 has suitable suction means (not shown) to attract all of the mist supplied by the first mist generator 34 and not attracted to the paper 30.

A second mist generator 36, which is preferably the same type as the mist generators 14 and 15, is spaced from the first mist generator 34 in the direction of movement of the paper 30. A mist of the material from the second mist generator 36 is applied after the paper 30 has passed the first mist generator 34. The second mist generator 36 has potassium ferricyanide when the first mist generator 34 has ferrous chloride.

Thus, potassium ferricyanide from the second mist generator 36 also is attracted to the charged regions, which are the selected portions. The potassium ferricyanide reacts with ferrous chloride from the first mist generator 34 retained on the selected portions of the paper 30 to record the desired information such as characters, for example, on the paper 30 through producing a desired contrast. This reaction occurs very rapidly, and the paper 30 is dry immediately thereafter. It should be understood that the material from the second mist generator 36 is applied to all of the paper 30.

The second mist generator 36 is enclosed by a hood 37. The hood 37 has suitable suction means (not shown) to attract all of the mist supplied by the second mist generator 36 and not attracted to the paper 30.

Figure 3:
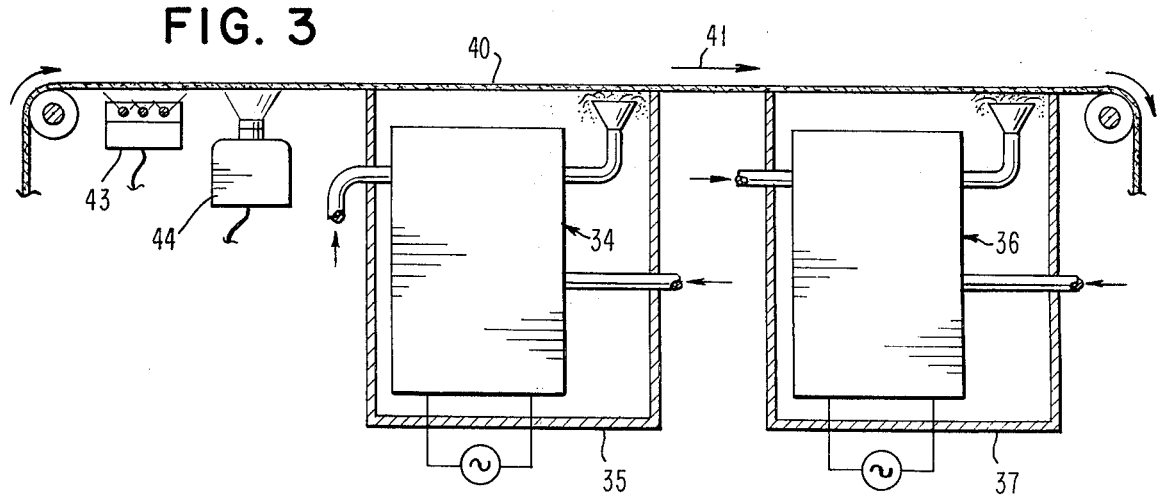
FIG. 3 is a schematic view of a further modification of the present invention for electrostatically recording information on a recording surface.

Referring to FIG. 3, there is shown another embodiment in which a paper 40 moves in the direction of an arrow 41. The paper 40 is an optically sensitive dielectric paper such as zinc oxide (ZnO) coated paper, for example. Thus, any portion of the paper 40 exposed to light does not retain a charge thereon.

The paper 40 is charged over its entire surface on the side having the zinc oxide coating by an electrostatic field source such as a corona discharge unit 43, for example. After the paper 40 has passed the corona discharge unit 43, an optical exposure device 44, which can be white light, for example, is applied to the portions of the paper 40 which are not to have information recorded thereon to cause exposure to light so that the charge is not retained thereon. Thus, the unexposed portions of the paper 40 retain the charge thereon, and these are the selected portions of the paper 40 on which information is to be recorded.

The mist generators 34 and 36 and the hoods 35 and 37 of FIG. 2 are utilized with this embodiment. Accordingly, the mist from the first mist generator 34 is attracted to the charged portions of the paper 40. These are the portions of the upper 40 not exposed to light by the optical exposure device 44. The mist from the second mist generator 36 also is applied to the selected portions of the paper 40, which are charged and have the material of the mist of the first mist generator 34 thereon. Accordingly, the same type of reaction occurs as has been discussed with respect to FIG. 2. This arrangement must be enclosed in a dark environment to prevent exposure of the paper 40 to light until after the second mist has been applied.

The corona discharge unit 43 and the optical exposure device 44 could be utilized to produce copying in the same manner as an electrostatic copier, for example. However, the arrangement of FIG. 3 would eliminate the need of the toner, the necessity of fusing the toner to the paper, and the need of cleaning the photoconductor drum.

The mist generators 14 and 15 or 34 and 36 can contain any two materials which will react with each other to produce a desired contrast with the paper 10, 30, or 40. Thus, the materials can be inorganic, organic, or mixed organic-inorganic materials. Another suitable mixture includes ferric chloride ($FeCl_3$) in the first mist generator 14 or 34 and potassium ferrocyanide [$K_4Fe(CN)_6$] in the second mist generator 15 or 36.

The first mist generator 14 or 34 also could have ferrous tannate for reaction with either air or hydrogen peroxide ($H_2O_2$) from the second mist generator 15 or 36. The first mist generator 14 or 34 also can have ferrous sulphate-tanic acid as the material to be selectively applied to the paper 10, 30, or 40 while air or hydrogen peroxide ($H_2O_2$) would be supplied from the second mist generator 15 or 36 for reacting therewith. Instead of using potassium ferricyanide in the second mist generator 15 or 36 with ferrous chloride from the first mist generator 14 or 36, ammonium sulfide [$(NH_4)_2S$] can be utilized in the second mist generator 15 or 36 for reaction with ferrous chloride.

It should be understood that the first mist generator 14 or 34 could contain potassium ferricyanide, potassium ferrocyanide, or ammonium sulfide with the second mist generator 15 or 36 containing ferrous chloride or ferric chloride. Thus, either of those chemicals could be applied initially to the selected portion as it is only necessary that there be a reaction between the materials applied to the paper 10, 30, or 40 to produce the desired contrast with the paper 10, 30, or 40.

While the mist from the second mist generator 15 of FIG. 1 must be colorless because it is applied to all of the paper 10 with a sufficient velocity to wet the paper 10 to obtain the desired enhancement, it should be understood that such is not required for the second mist from the second mist generator 36 in FIGS. 2 or 3. This is because the paper 30 or 40 retains the charge in the selected portions throughout its travel whereas the paper 10 does not have any magnetic field gradient after the paper 10 passes the magnetic field source 12. With the paper 30 or 40 having the selected portions charged, the second mist from the second mist generator 36 in FIGS. 2 or 3 does not have to be directed to the paper 30 or 40 with a sufficient velocity to wet the paper 30 or 40 to obtain the desired enhancement since the second mist from the second mist generator 36 is attracted to the charged portions.

While the present invention has shown and described the recording surface as being paper, it should be understood that any other suitable material can be employed. It is only necessary that the recording surface be capable of receiving and transmitting the magnetic field gradient or that the recording surface be capable of retaining the charge of the electrostatic field.

An advantage of this invention is that the paper is dry immediately after reaction of the materials. Another advantage of this invention is that no specially prepared recording surface is required for the reaction of the materials with each other. A further advantage of this invention is that faster copying is obtainable.

While the invention has been particularly shown and described with reference to preferred embodiments thereof, it will be understood by those skilled in the art that the foregoing and other changes in form and details may be made therein without departing from the spirit and scope of the invention.

What is claimed is:

1. An apparatus for recording information on a recording surface including:
   first means to selectively apply a mist of at least a first material to selected portions of the recording surface;
   and second means to apply to the recording surface a mist of a second material that reacts with the first material on the selected portions of the recording surface to produce a contrast with the recording surface to record information at the selected portions of the recording surface.

2. The apparatus according to claim 1 in which said first applying means includes:
   means to apply a field to the selected portions of the recording surface to attract the first material thereto;
   and means to supply the first material for attraction to the selected portions of the recording surface.

3. The apparatus according to claim 2 in which:
   the recording surface is capable of retaining a charge on any portion thereof from an electrostatic field;
   and said field applying means includes means to apply an electrostatic field to charge the selected portions of the recording surface.

4. The apparatus according to claim 3 in which said electrostatic field applying means includes:
   means to apply the electrostatic field to the entire recording surface to provide a charge on the entire recording surface;
   and means to remove the charge from all of the recording surface except the selected portions.

5. The apparatus according to claim 3 in which said electrostatic field applying means includes means to apply the electrostatic field to only the selected portions of the recording surface to charge only the selected portions.

6. The apparatus according to claim 1 in which:
   the first material is disposed in a carrier of;
   and said first applying means includes means to cause the carrier to be selectively applied to the selected portions of the recording surface to selectively apply the first material to the selected portions of the recording surface.

7. The apparatus according to claim 6 in which:
   the carrier is a magnetic carrier;
   and said causing means includes:
     means to apply a magnetic field gradient to the selected portions of the recording surface;
     and means to supply the mist toward the recording surface to cause the first material and the magnetic carrier to be attracted to the selected portions of the recording surface by the magnetic field gradient.

8. A method for recording information on a recording surface including:
   selectively applying mist of at least a first material to selected portions of the recording surface;
   and applying to the recording surface a mist of a second material that reacts with the first material on the selected portions of the recording surface to produce a contrast with the recording surface to record information at the selected portions of the recording surface.

9. The method according to claim 8 including:
   the recording surface being capable of retaining a charge on any portion thereof from an electrostatic field;
   applying an electrostatic field to charge the selected portions of the recording surface to attract the first material thereto;
   and applying the first material for attraction to the selected portions of the recording surface.

10. The method according to claim 9 including:
    applying the electrostatic field to the entire recording surface to provide a charge on the entire recording surface;
    and removing the charge from all of the recording surface except the selected portions.

11. The method according to claim 9 including applying the electrostatic field to only the selected portions of the recording surface to charge only the selected portions.

12. The method according to claim 8 in which:
    the first material is disposed in a carrier;
    and the first material is applied to selected portions of the recording surface by the carrier being selectively applied to the selected portions of the recording surface.

13. The method according to claim 8 in which:
    the first material is disposed in a magnetic carrier;
    a magnetic field gradient is applied to the selected portions of the recording surface;
    and the first material is applied to the selected portions of the recording surface by the magnetic carrier being attracted to the selected portions of the recording surface.

14. The method according to claim 8 including:
applying a field to the selected portions of the recording surface to attract the first material thereto;
and supplying the first material for attraction to the selected portions of the recording surface.

15. The apparatus according to claim 7 in which:
the magnetic carrier includes a third material to produce a contrast with the recording surface to record information at the selected portions of the recording surface when the first material and the magnetic carrier are attracted to the selected portions of the recording surface by the magnetic field gradient;
and the reaction of the second material with the first material on the selected portions of the recording surface enhances the contrast of the recorded information at the selected portions of the recording surface with respect to the recording surface.

16. The apparatus according to claim 15 in which the recording surface is paper.

17. The apparatus according to claim 6 in which:
a carrier includes a third material to produce a contrast with the recording surface to record information at the selected portions of the recording surface when the first material and the carrier are attracted to the selected portions of the recording surface;
and the reaction of the second material with the first material on the selected portions of the recording surface enhances the contrast of the recorded information at the selected portions of the recording surface with respect to the recording surface.

18. The apparatus according to claim 5 in which:
a third material is applied with the first material to the selected portions of the recording surface to produce a contrast with the recording surface to record information at the selected portions of the recording surface;
and the reaction of the second material with the first material on the selected portions of the recording surface enhances the contrast of the recorded information at the selected portions of the recording surface with respect to the recording surface.

19. The apparatus according to claim 4 in which:
a third material is applied with the first material to the selected portions of the recording surface to produce a contrast with the recording surface to record information at the selected portions of the recording surface;
and the reaction of the second material with the first material on the selected portions of the recording surface enhances the contrast of the recorded information at the selected portions of the recording surface with respect to the recording surface.

20. The apparatus according to claim 3 in which:
a third material is applied with the first material to the selected portions of the recording surface to produce a contrast with the recording surface to record information at the selected portions of the recording surface;
and the reaction of the second material with the first material on the selected portions of the recording surface enhances the contrast of the recorded information at the selected portions of the recording surface with respect to the recording surface.

21. The apparatus according to claim 2 in which:
a third material is applied with the first material to the selected portions of the recording surface to produce a contrast with the recording surface to record information at the selected portions of the recording surface;
and the reaction of the second material with the first material on the selected portions of the recording surface enhances the contrast of the recorded information at the selected portions of the recording surface with respect to the recording surface.

22. The apparatus according to claim 1 in which:
a third material is applied with the first material to the selected portions of the recording surface to produce a contrast with the recording surface to record information at the selected portions of the recording surface;
and the reaction of the second material with the first material on the selected portions of the recording surface enhances the contrast of the recorded information at the selected portions of the recording surface with respect to the recording surface.

23. The method according to claim 13 in which:
the magnetic carrier includes a third material to produce a contrast with the recording surface to record information at the selected portions of the recording surface when the first material and the magnetic carrier are attracted to the selected portions of the recording surface by the magnetic field gradient;
and the reaction of the second material with the first material on the selected portions of the recording surface enhances the contrast of the recorded information at the selected portions of the recording surface with respect to the recording surface.

24. The method according to claim 23 in which the recording surface is paper.

25. The method according to claim 12 in which:
the carrier includes a third material to produce a contrast with the recording surface to record information at the selected portions of the recording surface when the first material and the carrier are attracted to the selected portions of the recording surface;
and the reaction of the second material with the first material on the selected portions of the recording surface enhances the contrast of the recorded information at the selected portions of the recording surface with respect to the recording surface.

26. The method according to claim 14 including:
applying a third material with the first material to the selected portions of the recording surface so that the third material produces a contrast with the recording surface to record information at the selected portions of the recording surface;
and enhancing the contrast of the recorded information at the selected portions of the recording surface with respect to the recording surface by the reaction of the second material with the first material on the selected portions of the recording surface.

27. The method according to claim 11 including:
applying a third material with the first material to the selected portions of the recording surface so that the third material produces a contrast with the recording surface to record information at the selected portions of the recording surface;
and enhancing the contrast of the recorded information at the selected portions of the recording surface with respect to the recording surface by the reaction of the second material with the first material on the selected portions of the recording surface.

28. The method according to claim 10 including:

applying a third material with the first material to the selected portions of the recording surface so that the third material produces a contrast with the recording surface to record information at the selected portions of the recording surface;

and enhancing the contrast of the recorded information at the selected portions of the recording surface with respect to the recording surface by the reaction of the second material with the first material on the selected portions of the recording surface.

29. The method according to claim 9 including:

applying a third material with the first material to the selected portions of the recording surface so that the third material produces a contrast with the recording surface to record information at the selected portions of the recording surface;

and enhancing the contrast of the recorded information at the selected portions of the recording surface with respect to the recording surface by the reaction of the second material with the first material on the selected portions of the recording surface.

30. The method according to claim 8 including:

applying a third material with the first material to the selected portions of the recording surface so that the third material produces a contrast with the recording surface to record information at the selected portions of the recording surface;

and enhancing the contrast of the recorded information at the selected portions of the recording surface with respect to the recording surface by the reaction of the second material with the first material on the selected portions of the recording surface.

* * * * *